(12) United States Patent
Bos et al.

(10) Patent No.: US 11,972,031 B2
(45) Date of Patent: Apr. 30, 2024

(54) DEVICE AND METHOD FOR SECURE COMMUNICATION

(71) Applicants: KONINKLIJKE PHILIPS N.V., Eindhoven (NL); Stichting VU, Amsterdam (NL)

(72) Inventors: Hendrik Jaap Bos, Eindhoven (NL); Elias Athanasopoulos, Eindhoven (NL); Radhesh Krishnan Konoth, Eindhoven (NL); Kaveh Razavi, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 177 days.

(21) Appl. No.: 17/775,322

(22) PCT Filed: Nov. 3, 2020

(86) PCT No.: PCT/EP2020/080729
§ 371 (c)(1),
(2) Date: May 9, 2022

(87) PCT Pub. No.: WO2021/094125
PCT Pub. Date: May 20, 2021

(65) Prior Publication Data
US 2022/0391543 A1 Dec. 8, 2022

(30) Foreign Application Priority Data
Nov. 12, 2019 (EP) ..................... 19208505

(51) Int. Cl.
*G06F 21/72* (2013.01)
*G06F 21/34* (2013.01)
(Continued)

(52) U.S. Cl.
CPC .............. *G06F 21/72* (2013.01); *G06F 21/34* (2013.01); *G06F 21/606* (2013.01); *G06F 21/74* (2013.01); *G06F 21/84* (2013.01)

(58) Field of Classification Search
CPC ........ G06F 21/72; G06F 21/34; G06F 21/606; G06F 21/74; G06F 21/84
See application file for complete search history.

(56) References Cited

U.S. PATENT DOCUMENTS

| 2004/0123118 A1* | 6/2004 | Dahan ..................... G06F 21/74 |
| | | 712/E9.082 |
| 2006/0177068 A1* | 8/2006 | Hatakeyama ........... G06F 21/51 |
| | | 380/282 |

(Continued)

FOREIGN PATENT DOCUMENTS

| CN | 108389049 A | 8/2018 |
| EP | 3173967 A1 | 5/2017 |
| GB | 2406403 A | 3/2005 |

OTHER PUBLICATIONS

Hartig et al "Lateral Thinking for Trustworthy Apps" Proceedings of the Int. Conf. on Distributed Computing Systems, Jun. 5, 2017 p. 1890-1899.

(Continued)

*Primary Examiner* — Amie C. Lin

(57) ABSTRACT

Some embodiments are directed to secure communication with a server from a device. The device is configured to decrypt an encrypted message in a secure mode with a private key, and to display secret shared with the user together with the decrypted message on a display of the device to indicate to the user that the message is being displayed by software running in the secure mode.

20 Claims, 9 Drawing Sheets

(51) Int. Cl.
    *G06F 21/60*     (2013.01)
    *G06F 21/74*     (2013.01)
    *G06F 21/84*     (2013.01)

(56) References Cited

U.S. PATENT DOCUMENTS

| | | | |
|---|---|---|---|
| 2015/0310427 A1 | 10/2015 | Yi | |
| 2017/0164201 A1* | 6/2017 | Li | G06F 21/57 |
| 2017/0193242 A1* | 7/2017 | Luo | G06F 21/74 |
| 2018/0254898 A1 | 9/2018 | Sprague et al. | |
| 2020/0175183 A1* | 6/2020 | Ramasamy | G06F 21/30 |

OTHER PUBLICATIONS

Brandon et al "Trusted Display and Input Using Screen Overlays" 2017 Int. Conf. on Reconfigurable Computing and FPGAS, Dec. 4, 2017 p. 1-6.
International Search Report and Written Opinion from PCT/EP2020/080729 dated Dec. 8, 2020.

\* cited by examiner

DEVICE AND METHOD FOR SECURE COMMUNICATION

CROSS-REFERENCE TO PRIOR APPLICATIONS

This application is the U.S. National Phase application under 35 U.S.C. § 371 of International Application No. PCT/EP2020/080729, filed on Nov. 3, 2020, which claims the benefit of EP Patent Application No. EP 19208505.8, filed on Nov. 12, 2019. These applications are hereby incorporated by reference herein.

FIELD OF THE INVENTION

The presently disclosed subject matter relates to a cryptographic device configured for secure communication with a server, a cryptographic method for secure communication with a server, and a transitory or non-transitory computer readable medium.

BACKGROUND OF THE INVENTION

As more and more transactions are performed on the internet, the importance of securing those transactions becomes ever more important. Several solutions have been proposed to address this issue. For example, secure transactions on the Internet often rely on two-factor authentication (2FA).

Today's Two-Factor Authentication (2FA) schemes for secure online banking and payment services often use smartphones for the second factor during initial authentication or subsequent transaction verification. As a result, such solutions are vulnerable to attacks and offer only weak security guarantees. Specifically, attackers may compromise the phone, possibly including the kernel, and break the second factor. This is true for mobile-only banking services, but also for solutions that use a separate device, e.g., a PC, to initiate a transaction. For example, an attack may be started by exploiting a weakness in existing software, convincing a user to install compromised software, a virus, and the like.

Users increasingly rely exclusively on mobile applications for using their bank services, purchasing products, or booking trips. Using web-based payment services through a smartphone brings convenience, as users can now access them anytime and anywhere—even when access to a personal computer is not possible. However, such convenience comes at a cost to security guarantees offered by 2FA. Specifically, 2FA often assume the two factors remain independent and isolated, because it requires a compromise of both factors to initiate fraudulent transactions; yet this assumption is often not true, when a single device, such as a smartphone, serves both factors, since the attacker needs to compromise only the potentially vulnerable smartphone for breaking 2FA. e.g., using mobile phones. Weak separation between the factors implies that if one factor is compromised, this may be enough to break all factors.

Even PC-initiated transactions are not safe if the attacker obtains root privileges on the mobile device. In that case, attackers can replace or tamper with the mobile apps, intercept messages and display misleading information.

Unfortunately, compromising smartphones is a realistic threat especially given a compromised PC because even though the phone and PC are physically separate, the devices are often not independent. Surprisingly, despite ample proof that today's phone-based 2FA is weak in practice this is not at all a solved problem.

Even advanced solutions tend to focus on a limited threat model that excludes fully compromised phones where an attacker obtains root access, infects the kernel and/or the corresponding app. Given that 2FA is often used in high-value interactions (e.g., banking) and full system compromises are a common occurrence, such a limited threat model is insufficient. It is desired to improve a transaction's authenticity, e.g., to prevent an attacker from initiating a transaction on behalf of the user or server without being noticed.

Although in practice the problems often begin with a lack of separation between the two factors, even if there is a strong separation, there are other, equally fundamental, issues. In particular, an aspect of secure communication that has been neglected is that of transaction integrity, e.g., preventing an attacker from modifying the content of the messages exchanged or displayed. Even with perfect transaction authentication, the system may still be compromised if transaction integrity is weak. For example, an attacker may hijack a user's transaction by displaying misleading information on the display, breaking the integrity of the transaction.

SUMMARY OF THE INVENTION

It would be advantageous to improve secure communication between a device and a server.

One way to improve both transaction authentication and integrity is to use a processor system which is configured with a normal mode and a secure mode. Data and code in the secure mode may be isolated from the normal mode. If a private key is stored in the secure data part, then a message that arrives from the server encrypted with the corresponding public key can only be decrypted with the private key, and by implication only by software running the secure mode. Although this will improve security of the communication, problems remain. For example, an attacker who has compromised the normal part of the device could control the information visible to the user. For example, the attacker could ask a server to perform a transaction A even though the user thinks he is agreeing to a transaction B. For example, while the messages on the screen indicate to the user that he is, say, buying a book online, in reality and unbeknownst to him, he is transferring funds to the attacker.

In an embodiment, the data stored at the device that can only be accessed in secure mode not only comprise a private key, e.g., to decrypt a message coming from the server, they comprise a shared secret, e.g., a secret that is shared between the secure mode software and the user.

Setting the shared secret may be performed in an enrollment phase. For example, the device may be configured to allow the user to set the shared secret, e.g., when initializing the device, e.g., when first starting up the device. The enrollment phase may also be performed when the second mode software is first installed or first configured, etc.

The shared secret could comprise text, e.g., a word or a phrase; the shared message could comprise an image. For example, the user may type the text, e.g., on a keyboard, e.g., a virtual keyboard on a touch screen. For example, the user may take an image with a camera of the device, e.g., a selfie, a picture of his home, his cat, etc.

Later, e.g., during a use phase, when an encrypted message is received from the server, the secure mode software can decrypt it and display the message together with the shared secret. Since the shared secret is only known to the user and to the secure mode software, this indicates to the user that the message is being displayed by secure mode software.

An attacker who has compromised normal mode software, cannot show the shared secret. Accordingly, integrity is increased. This device, method or system for delivering a message from a server to a user can be used in the context of transactions, e.g., bank-transfers, but also outside of transactions. For example, the message may be informative. The message may be pushed by the server. For example, the message may inform the user that he needs to pick up a new bank card, set a new hospital appointment, or the like. Because the message is displayed together with the shared secret, the user has increased trust in the message.

The form in which the message is transferred, and the form in which it is displayed need not be the same. For example, the message may be compressed, may have metadata, and the like, but the shown message may be uncompressed, or have its meta-data stripped.

The encryption of messages is preferably combined with signing of the message, or other authentication elements. For example, the secure mode software may decrypt the message and verify a signature on the message. Thus, when a message is shown, the user has increased trust, not only that it was decrypted by secure software but also that it was verified. For example, the secure mode may have access to one or more certificates to verify the signature. The certificate(s) may be stored in secure mode data, but this is not needed; they may be in normal mode, or received with the message.

When used in a transaction, e.g., the secure communication may be used for authenticating the user. This may be the only authentication, but may also be combined with other authentication factors, e.g., credentials, biometrics and the like. For example, an encrypted authentication tag may be received, e.g., together with the encrypted message. The encrypted authentication tag may also be decrypted by secure mode software, e.g., second software, using a private key in secure mode data, e.g., the same key as used for the message or a different key. The authentication tag may be comprised in the message. The latter has the advantage that only one decryption is needed. Encrypted tag and encrypted message may also be two different communications.

Note that the transaction may be initiated on the cryptographic device, but this is not needed. The transaction could also be initiated on, e.g., a PC, e.g., as part of browsing session. For example, a user may want to make a bank transfer, e.g., to pay for a product or service, and cause the PC to send a message to the server, e.g., the bank, over the internet. The server may respond by sending the encrypted tag and/or encrypted message to the cryptographic device, e.g., a device different from the initiating device, e.g., to a mobile phone different from the PC.

The secure mode software, e.g., the second software may be configured to decrypt the authentication tag. To authenticate the cryptographic device may be configured to send a response to the server that depends on the authentication tag to prove that it knows the decryption key. This can be done in a number of ways.

First the response may depend on the tag in a number of ways. The response may comprise the tag itself, a hash of the tag, an encryption over the tag, a signature over the tag, a mac over the tag, and so on, possibly in any combination. When the server receives the response, it can verify its relationship with the tag it sent to the device. If the relationship is verified, then this increases trust that the sender of the response knew the tag, and thus that it knew the private key to decrypt the encrypted tag. The response may also include a hash of the message.

Second, there are various ways to create the response. For example, the response may be computed, at least in part, by the secure mode software. The secure mode software can then export the response to the normal mode software. For example, the response may be exported in plain, to the normal mode software who can then compute, at least in part, the response. Note that exporting the plain tag does not have to lead to an attack, even if the normal mode software is compromised. An attacker may or may not forward the true tag, may or may not modify it, etc., but the attacker cannot avoid that the message was seen by the user. Thus, the server may inform the user what the tag is for, e.g., for what transaction, e.g., for what bank transfer. If the user does not want this transfer, he can stop the tag from being exported. The server can be configured not to allow a change to the request after it sent out the encrypted tag. If it is desired to avoid the plain transfer of the tag, it could be encrypted before passing from secure mode to normal mode, e.g., with a key, e.g., with the public key of the server.

Instead of handling the transfer of the tag from the decryption to the computing of the response internally, the device may also transfer the tag through the user. For example, the decrypted tag may be displayed on the display together with the shared secret, and optionally, together with a message from the server. The user knows the tag comes from secure mode software since it recognizes the shared secret. The user can then enter the tag in some other software that may use it to compute the response. The other software may be normal mode software running on the same device, or even software running on a different device, e.g., a PC, e.g., the PC used for initiating the transaction. Using the user to transfer the tag is particularly advantageous to create security improvements for legacy software.

The tag may be any digital sequence, say a random 80 bit sequence, 128 bit, 256 bit, or more or less, etc. If the tag is to be transferred by a user it is advantageous to select a sequence of letters, digits, one or more words, etc., to ease the transfer. The normal and secure modes may be hardware-enforced isolated environments, which may even run their own normal and secure operating system and/or their own normal and secure apps. Existing technology can be used to create a normal and secure mode, e.g., ARM TrustZone.

Prototypes of various embodiments have been created and tested. In particular, an embodiment called 'SecurePay' was integrated in ten existing apps. The inventors found, that with the secure mode software in place, the changes to existing apps, e.g., to existing banking apps, were minimal. Changes typically required modification to only a small part of the existing apps, e.g., to cause them to accept an OTP from an interface from the secure mode, instead of from an SMS or the like. Moreover, if code modifications are not possible, e.g., not allowed, an embodiment of SecurePay could still be used as a secure drop-in replacement for existing SMS-based 2FA solutions. For example, the drop-in embodiment may intercept the SMS and provide the user with the decrypted tag. The decrypted tag may be entered by the user, without the legacy app realizing that it has been decrypted by secure mode software.

Embodiments, such as the SecurePay embodiments, provide security even in the presence of devices where all normal mode software is compromised, while retaining the convenience of mobile devices. Note that in an embodiment, only part of the SecurePay functionality needs implementation in the secure mode, e.g., functionality for handling the second factor, while the rest can be a normal mode part. In fact, it proved to be possible to create a secure mode application which was fully functional, yet small enough to allow formal verification.

Embodiments may apply to mobile-only transactions and to transactions initiated on a personal computer with the mobile device serving as for the second factor only. In an embodiment, the cryptographic device is not mobile phone, though still an electronic device.

An aspect of the presently disclosed subject matter concerns secure communication using signatures instead of encryption. For example, in messaging embodiments, which are not necessarily used with a tag for authentication or 2FA, it may be preferable to use a signature than encryption. One may use signature also together with encryption. The implementation examples given herein for encryption may be applied to embodiments using a signature or using a signature with encryption, e.g., for the message and/or tag received from the server.

The cryptographic device may be an electronic device. For example, the cryptographic device may be a computer. It may be a mobile electronic device, e.g., a mobile phone. The cryptographic device may be consumer electronic, e.g., a set-top box, a television, etc.

The secure communication method described herein may be applied in a wide range of practical applications. Such practical applications include: transfer of sensitive information, e.g., financial or medical information, authentication of transaction, e.g., financial transaction or medical appointments, etc.

A further aspect is a cryptographic method for secure communication with a server. The server may be a computer. An embodiment of the method may be implemented on a computer as a computer implemented method, or in dedicated hardware, or in a combination of both. Executable code for an embodiment of the method may be stored on a computer program product. Examples of computer program products include memory devices, optical storage devices, integrated circuits, servers, online software, etc. Preferably, the computer program product comprises non-transitory program code stored on a computer readable medium for performing an embodiment of the method when said program product is executed on a computer.

In an embodiment, the computer program comprises computer program code adapted to perform all or part of the steps of an embodiment of the method when the computer program is run on a computer. Preferably, the computer program is embodied on a computer readable medium.

Another aspect of the presently disclosed subject matter is a method of making the computer program available for downloading. This aspect is used when the computer program is uploaded into, e.g., Apple's App Store, Google's Play Store, or Microsoft's Windows Store, and when the computer program is available for downloading from such a store.

BRIEF DESCRIPTION OF THE DRAWINGS

Further details, aspects, and embodiments will be described, by way of example only, with reference to the drawings. Elements in the figures are illustrated for simplicity and clarity and have not necessarily been drawn to scale. In the figures, elements which correspond to elements already described may have the same reference numerals. In the drawings, FIG. 1 schematically shows an example of an embodiment of a communication system, FIG. 2a schematically shows an example of an embodiment of a cryptographic device, FIG. 2b schematically shows an example of an embodiment of a cryptographic device, FIG. 2c schematically shows an example of an embodiment of a cryptographic device, FIG. 3a schematically shows an example of an embodiment of a cryptographic device, FIG. 3b schematically shows an example of an embodiment of a cryptographic device, FIG. 3c schematically shows an example of an embodiment of a cryptographic device, FIG. 4a schematically shows an example of an embodiment of an authentication method, FIG. 4b schematically shows an example of an embodiment of an authentication method, FIG. 5 schematically shows an example of an embodiment of a cryptographic method, FIG. 6a schematically shows a computer readable medium having a writable part comprising a computer program according to an embodiment, FIG. 6b schematically shows a representation of a processor system according to an embodiment.

LIST OF REFERENCE NUMERALS IN FIGS. 1-3c,6a-6b 100 a communication system
110 a cryptographic device
120 a computer network
130, 170 a processor system
140, 180 a memory
150, 190 a communication interface
160 a server
200-202 a cryptographic device
210 communication interface
211 an encrypted message
212 an encrypted tag
213 a response message
220 a first software
231,232 a normal mode/secure mode interface
241 a private key
243 a public key
242 a cryptographic processing unit
244 a responder
250 a display generator
251 a shared secret
270 common hardware
271 a display
272 an input device
273 a tag
291 a normal mode
292 a secure mode
300 a cryptographic device
311 a display
312 an input button
314 a shared secret
315 a message
316 a tag
317 an accept button
318 public key
1000 a computer readable medium
1010 a writable part
1020 a computer program
1110 integrated circuit(s)
1120 a processing unit
1122 a memory 1124 a dedicated integrated circuit
1126 a communication element
1130 an interconnect
1140 a processor system

DETAILED DESCRIPTION OF THE EMBODIMENTS

Figure 1:
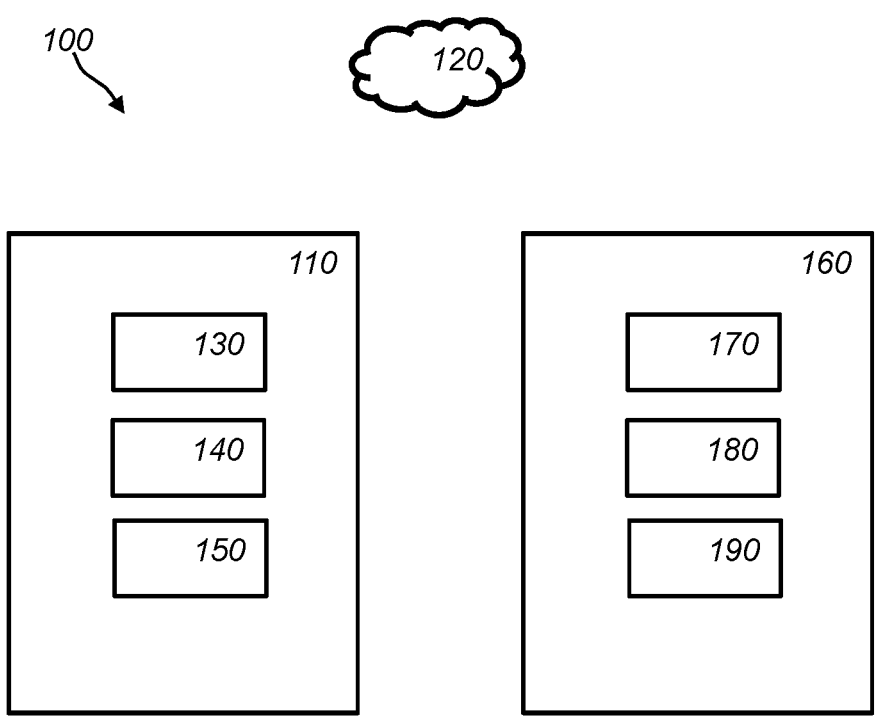

While the presently disclosed subject matter is susceptible of embodiment in many different forms, there are shown in the drawings and will herein be described in detail one or more specific embodiments, with the understanding that the present disclosure is to be considered as exemplary of the principles of the presently disclosed subject matter and not intended to limit it to the specific embodiments shown and described.

In the following, for the sake of understanding, elements of embodiments are described in operation. However, it will be apparent that the respective elements are arranged to perform the functions being described as performed by them.

Further, subject matter that is presently disclosed is not is not limited to the embodiments only, but also includes the every combination of features described herein or recited in mutually different dependent claims.

FIG. 1 schematically shows an example of an embodiment of a communication system 100. Communication system 100 comprises a cryptographic device 110 and a server 160.

In an embodiment, it may be desired that server 160 may send a message to device 110, e.g., intended for a user of device 110. For example, the message may be sensitive, e.g., relate to financial or medical matters, or the message may be security related, e.g., may be needed to authenticate device 110, or its user, to server 160. However, if device 110 is compromised, then a user may be shown any message on the display, e.g., by unauthorized software running on device 110, whilst the user may think that the message originates from server 160. Conventional hardware, even hardware that is otherwise highly-secure, e.g., hardware having a normal mode and a secure mode to separate security operations from non-security operations is vulnerable to this problem.

Cryptographic device 110 may comprise a processor system 130, a memory 140, and a communication interface 150. Server 160 may comprise a processor system 170, a memory 180, and a communication interface 190. Systems 110 and/or 160 may communicate with each other, external storage, input devices, output devices, and/or one or more sensors over a computer network 120. The computer network may be an internet, an intranet, a LAN, a WLAN, etc. The computer network may be the Internet. The systems comprise a connection interface which is arranged to communicate within the system or outside of the system as needed. For example, the connection interface may comprise a connector, e.g., a wired connector, e.g., an Ethernet connector, an optical connector, etc., or a wireless connector, e.g., an antenna, e.g., a Wi-Fi, 4G or 5G antenna.

Computer network 120 may comprise additional elements, e.g., a router, a hub, etc., which are not shown separately in FIG. 1. In device 160, the communication interface 190 may be used, e.g., to send one or more encrypted messages to device 110 and/or to receive one or more encrypted responses from device 110. In device 110, the communication interface 150 may be used, e.g., to receive one or more encrypted messages from server 160 and/or to send one or more encrypted responses to server 160. The communication interfaces may also be used to send un-encrypted messages, etc. The messages may be digital messages, e.g., received in electronic form.

Figure 2A:
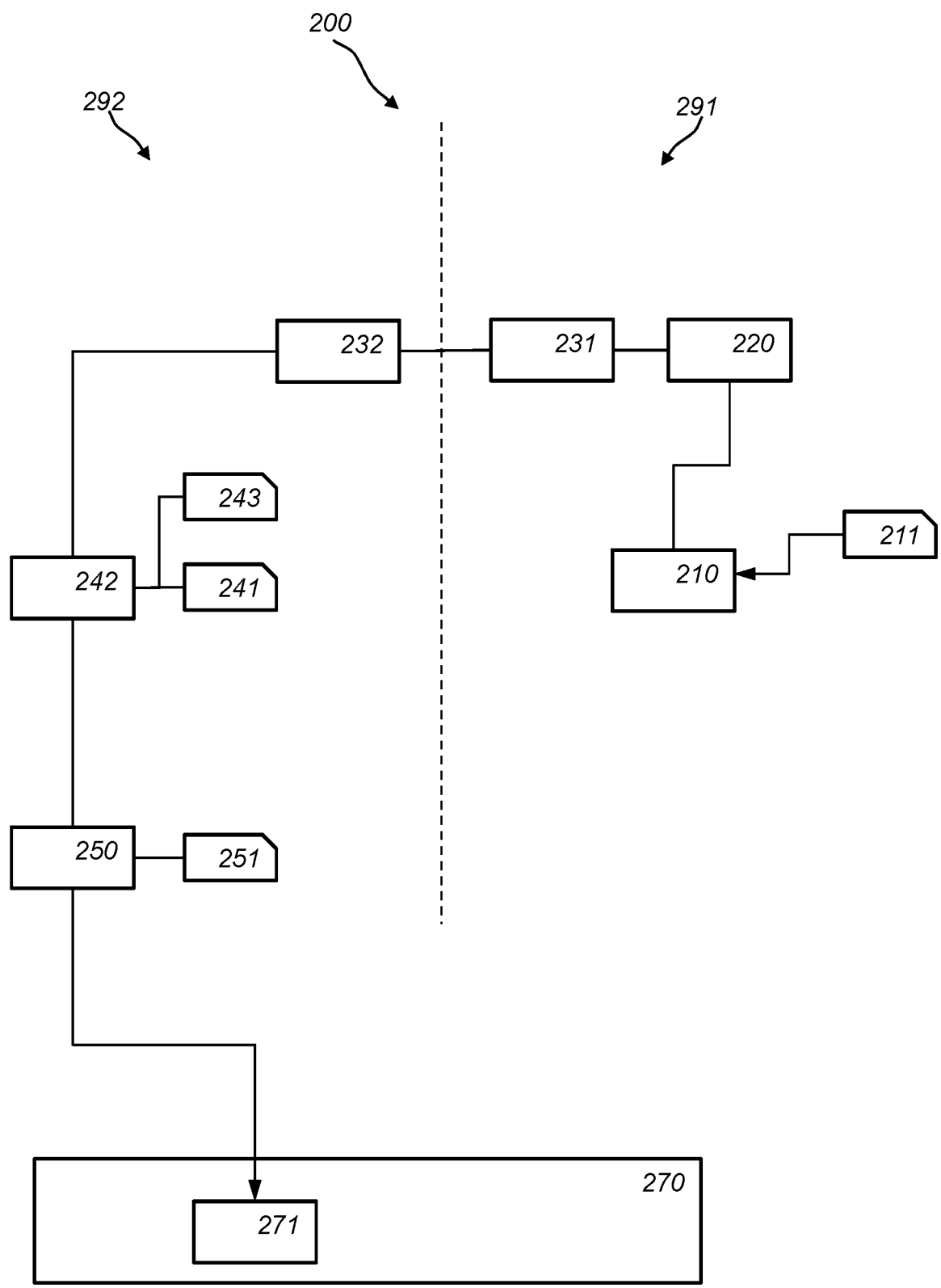
Figure 2B:
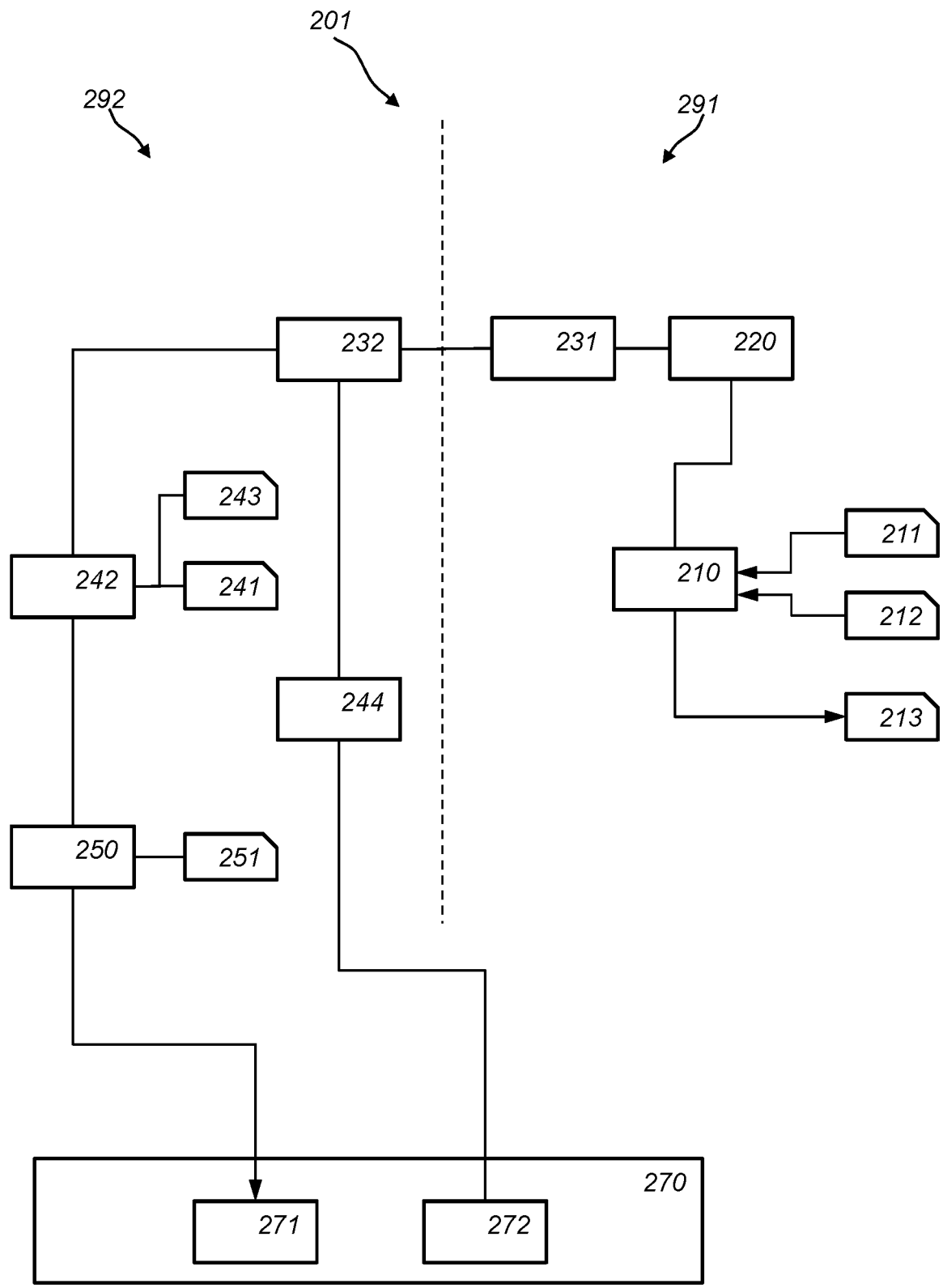
Figure 2C:
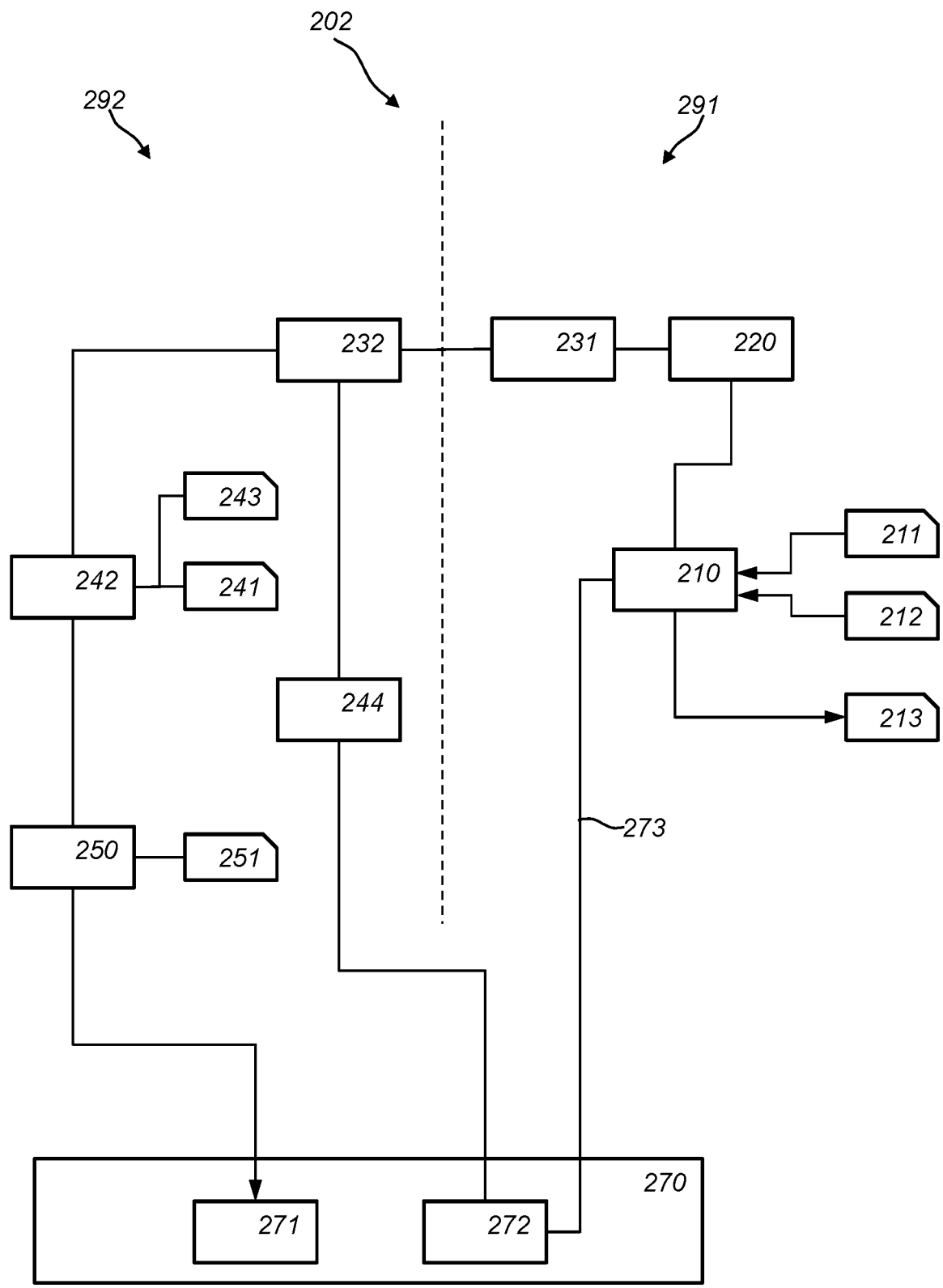

The execution of devices 110 and 160 may be implemented in a processor system, e.g., one or more processor circuits, e.g., microprocessors, examples of which are shown herein. FIGS. 2a-2c show functional units that may be functional units of the processor system of device 110. For example, these figures may be used as a blueprint of a possible functional organization of the processor system. The processor circuit(s) are not shown separate from the units in these figures For example, the functional units shown in FIGS. 2a-2c may be wholly or partially implemented in computer instructions that are stored at device 110, e.g., in an electronic memory of device 110, and are executable by a microprocessor of device 110. In hybrid embodiments, functional units are implemented partially in hardware, e.g., as coprocessors, e.g., cryptographic coprocessors, and partially in software stored and executed on device 110.

FIG. 2a schematically shows an example of an embodiment of a cryptographic device 200. For example, device 200 may be implemented on a device such as device 110. Device 200 is configured for secure communication with a server. The server is not shown in FIG. 2a. For example, the server could be server 160.

For example, in an embodiment, the server is configured for secure communication with the cryptographic device, the server comprising a communication interface configured to communicate with the device, a key storage configured to store a public key corresponding to a private key of the cryptographic device, and a processor system configured for generating a message for the cryptographic device, encrypting the message being with the public key of the device, and sending the encrypted message from the server to the device.

In an embodiment of device 200, the encrypted message sent from the server is displayed in such a manner that a user of device 200 has increased confidence that the message is displayed by a secure mode of device 200, and thus that it is less likely that the message that is being displayed is compromised by the unauthorized software that may be running on device 200 as a result of an attack. More generally speaking, any cryptographic assurance that is achieved for some content as a result of the cryptographic processing of the second software, being the protection of integrity, e.g., verification of signatures, MACs and the like, or the protection of confidentiality, e.g., decryption, is extended to the content while it is being displayed together with a shared secret as explained herein.

Device 200, and in particular, the processor system of device 200 is configured with a normal mode and secure mode. The normal mode and secure mode are sometimes referred to as normal world and secure world, (and sometimes for simplicity as first mode and second mode). The normal mode may be used to run less critical software, e.g., user applications, games and the like. The secure mode is used to run more critical software, e.g., software that handles secret information, such as secret keys. For example, decrypt or sign operations may be performed in the secure mode. Some applications may for the most part be implemented in the normal mode, but in part rely on a component in the secret mode. For example, a banking application may for the most part run in the normal mode, but when the transaction needs to be performed may rely on a part running in the secure mode.

In the diagram shown in FIG. 2a, the partition in normal mode and secure mode has been illustrated with a vertical dashed line. On the left, secure mode 292 is shown and on the right normal mode 291. Operations that may be performed in secure mode are depicted at the secure side 292, while operations that may be performed in normal mode are depicted at normal side 291. Software that is running in the normal mode, may be referred to as first software, while software that is running in the secure mode may be referred to as second software. The secure mode may also be referred to as a trusted execution environment (TEE).

Data and code in the secure mode are isolated from the normal mode. For example, in the secure mode, a private key 241 and a shared secret 251 may be stored. This means that first software is running in the normal mode cannot access this data. Software running in the secure mode can access this data.

Private key 241 may correspond to a public key of the cryptographic device which may be available to the server. For example, a message from the server may be encrypted with the public key. The private key 241 and the public key together form a so-called, public/private key-pair.

Setting the shared secret may be performed in an enrollment phase. For example, the device may be configured to allow the user to set the shared secret, e.g., when initializing the device, e.g., when first starting up the device. The enrollment phase may also be performed when the second mode software is first installed or first configured. The latter may be later than the first use of the device, possibly even much later. If the device were already compromised at that time, then shown messages can still not be trusted: when the user thinks he is entering his shared secret to the secure mode software he might in reality entering it in the attacker's software. However, this still has the advantage, that if the device is not compromised at that time, messages can be trusted even if the device is compromised later. Generally speaking, the closer the enrollment phase is to the trusted, e.g., pristine, e.g., initialized, state of the device, the better the trust in the message. Yet, installing the system is nevertheless better done late than never.

In the normal mode, a first software is executed; in the secure mode, the second software is executed. To pass information from normal mode to secure mode or vice versa, an interface may be installed. For example, FIG. 2a shows a normal mode/secure mode interfaces 231 and 232, through which a message may be passed from one mode to another. Various access restrictions, or controls may be imposed on these interfaces. For example, first software has no access to second software data except insofar the second software puts it on the interface to pass to the normal mode. For example, code passed from the normal mode to the secure mode may only be executed if it is signed with the private key of an appropriate authority, e.g., the manufacturer of device 200. For example, interfaces 231 and 232 may be formed by memory that can be accessed in secure and normal mode alike.

Preferably, the secure mode is a hardware-enforced isolated environment. For example, normal mode and secure mode may be implemented using a hardware bit, which is configured so flipping said bit changes data access and diverts control to first or second software as needed. For example, device 200 may have an electronic memory which in only accessible in the secure mode, e.g., if said bit is in the secure position. For example, a first operating system of device 200 may run in the normal mode, and a second operating system of device 200 may run in the secure mode.

Although, code and data may be strictly separated in device 200, software running in these two modes may nevertheless have access to the same hardware, or in part. FIG. 2a shows common hardware 270 which may be used by normal and secure mode software. For example, common hardware 270 may comprise a display 271. Both first and second mode software can display on display 271. Nevertheless, the common hardware is shielded to avoid forming a backchannel between the two modes. For example, software running in normal mode is blocked from screen capturing the displaying of the message by the second software. Likewise, software running in normal mode may be blocked from superimposing over the display while the second software is running. For example, in an embodiment, the display may be operated from a frame buffer accessible from the normal mode, and from a frame buffer accessible from the secure mode but not the normal mode. In this way, the secure mode can override access to the display if desired.

Any information that may be left in resources utilized by software running in the secure mode, that could be accessed by software running in normal mode, may be purged from sensitive information, e.g., the shared secret, the content of the message, before the system switches back to normal mode. For example, assume a single frame buffer is used to drive the display, and that normal software is blocked from accessing the frame buffer while the secure software is running in secure mode. After using the display to show, e.g., the shared secret and message, the frame buffer may be cleared before the system switches back to normal mode; in particular the shared secret and/or message and/or tag may be removed.

In the art, many examples of secure modes, secure mode software and the like are known—sometimes referred to as a Trusted Execution Environment (TEE). The TEE is a secure execution environment that may run in parallel with the operating system, e.g., of a smartphone or similar device. Several hardware vendors have introduced different hardware-assisted TEEs: Intel Identity Protection Technology, Intel Software Guard eXtension, ARM TrustZone etc. In particular embodiments have been prototyped and tested on TrustZone. A TrustZone-based TEE is supported by many devices. For example, conventionally, TEEs may manage trusted applications which provide security services to untrusted applications running on the normal mode operating system of the mobile device. For example, one may provide APIs for the creation of trusted applications running in secure mode.

A TEE may be provided, e.g., as in ARM TrustZone, by enabling the system to run in two execution domains in parallel: the normal and the secure world. The current state of the system may be determined by the value of the Non Secure (NS) bit of the secure configuration register. The secure domain may be privileged to access all hardware resources like CPU registers, memory and peripherals, while the normal domain is constrained. There may be an additional CPU mode called monitor, which serves as a gatekeeper, e.g., interface, between the two domains. This monitor mode may also be privileged, regardless of the status of the NS bit. Likewise, the memory address spaces may be divided into regions, which may be marked as secure or non-secure, e.g., using the TrustZone Address Space Controller. Peripherals may be marked as accessible to the secure world, e.g., by programming the TrustZone Protection controller.

To switch from normal to secure world, the system may initially switch to monitor mode by executing a Secure Monitor Call (SMC). This allows the monitor mode to verify whether switching from one world to the other should be permitted. If the request is determined valid, it modifies the NS bit accordingly and completes the world switch.

FIG. 2a shows a communication interface 210 configured to communicate with the server. Messages, encrypted or not, can pass between the server and device 200. Interface 210 may be a computer network interface. Interface 210 may operate in the normal mode, so that one has to assume its contents may be compromised. An encrypted message 211 is received from the server. Encrypted message 211 is encrypted with the public key of the cryptographic device. This means that it can only be decrypted with the private key that corresponds to it, that is with private key 241. Since private key 241 is only accessible in the secure mode, one may assume that an attacker cannot decrypt encrypted message 211. However, instead of decrypting message 211, an attacker may also try to mislead a user of device 200, by displaying information that does not correspond to the true content of message 211. However, device 200 may have countermeasures against this type of deceit as well.

Note that in addition to encryption, message 211 may be cryptographically protected in a number of other ways. For example, message 211 may be integrity protected, e.g., by signing by the server, e.g., with a private key of the server, or by including a message authentication code, e.g., under the encryption.

Running in the normal mode, e.g., the first mode, is the first software 220. First software 220 may be configured to forward encrypted message 211 to second software running in the secure mode, e.g., the second mode. For example, message 211 may pass through interface(s) 231/232.

Different components of the second software are shown on the left of FIG. 2a. For example, a cryptographic processing unit 242 may run in the secure mode, e.g., comprised in the second software. Cryptographic processing unit 242 is configured for performing cryptographic operations such as decryption or verification operations. Such as cryptographic processing unit may be implemented using software, e.g., a crypto library, or, at least in part, in hardware, e.g., using a cryptographic coprocessor.

Cryptographic processing unit 242 may be configured for decrypting encrypted message 211 with private key 241. Private key 241 is stored in the secure mode's data so that first software 220 does not have access to the key 241. For example, the decryption algorithm may be an asymmetric decryption algorithm, e.g., RSA private key decryption, elliptic curve private key decryption, or the like.

Encrypted message 211 may also be signed, e.g., with a private key of the server. Cryptographic processing unit 242 may be configured for verifying the signature on message 211 with public key 243. Public key 243 corresponds to the private key of the server. Public key 243 may be stored in the secure mode's data so that first software 220 does not have access to the key 241, and thus cannot influence how the verification will be performed. It is not necessary though for public key 243 to be stored in the secure mode data; it may be stored in the normal world instead or may be received together with the message 211. In the latter two cases, some check on the authenticity of public key 243 may be performed by crypto unit 242 on public key 243, e.g., verifying a certificate chain in which key 243 is part. The root of the certificate chain may be stored in the secure mode data. For example, the signature verification algorithm may be an asymmetric algorithm, e.g., RSA public key verification, elliptic curve public key decryption, or the like.

Whether to use a public key 243 and to verify signatures or to use a private key 241 and to decrypt messages, or whether to use both public key 243 and private key 241 to verify a signature and to decrypt a message depends on the application. Various examples, are given below and apply to various embodiments.

After message 211 has been decrypted, a display generator creates a display content and sends it to display 271. For example, the display content comprises the message but also a shared secret 251. Like private key 241, also the shared secret 251 is stored in the secure mode's data, so that the normal mode software, e.g., the first software, does not have access to it. The shared secret is a secret that is shared with the user. If the user sees the secrets, he knows that the display is caused by software running in the secure mode. Since unauthorized software is much more likely to penetrate into secure mode than into normal mode, this increases the user's trust that the display content that he is seeing is to be trusted, e.g., is generated by authorized software, e.g., is generated by the second software rather than by the first software.

Device 200 is preferably configured so that first software cannot write to the display while it is reserved, e.g., operated by, the second software. Likewise, the second software cannot read from the display to obtain the shared secret 251.

For example, if the user sees his shared secret 251 together with say instructions from his bank, or his doctor, or his husband or wife, or the like, he knows that said message was displayed by second software, this in turn means that it was decrypted by private key 241, which in turn means that an attacker operating in normal mode could not have read the message. Likewise, if a signature is verified on the message, then user seeing the message can be assured that the message really was signed by someone who knew the private key corresponding to the verifying public, e.g., that the message is probably authentic. The verifying public keys, e.g., key 243, may be stored in the secure mode data, but may also be received from the normal world, e.g., in the form of one or more certificates.

Second software may be configured, to display the cryptographic status of the message in the display content, e.g., whether or not the message was encrypted, and/or signed and by whom.

The server is termed thus, since it performs the function of sending encrypted and/or signed message(s) to the cryptographic device. The server may typically comprise a stand-alone computer, but may be implemented in a mobile device, e.g., another phone. In that case the device and server could send each other messages while alternating between device and server roles.

Figure 3A:
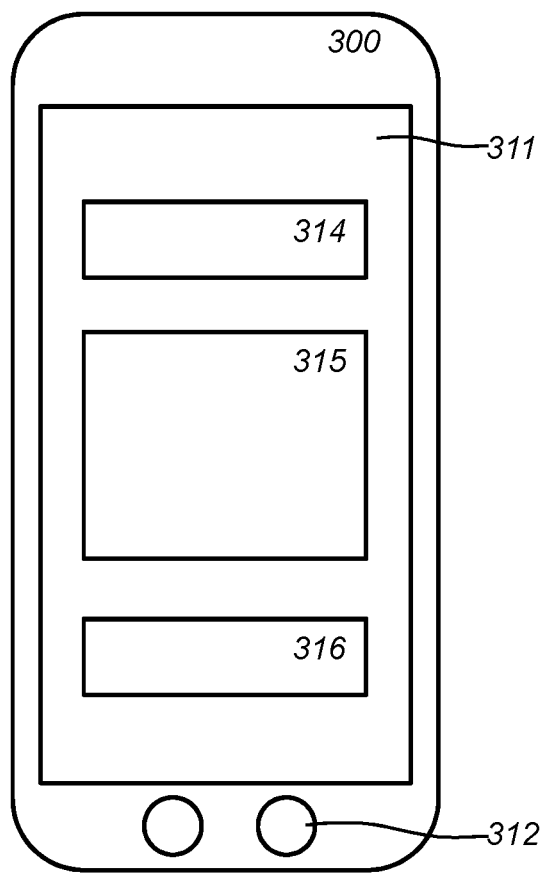
Figure 3B:
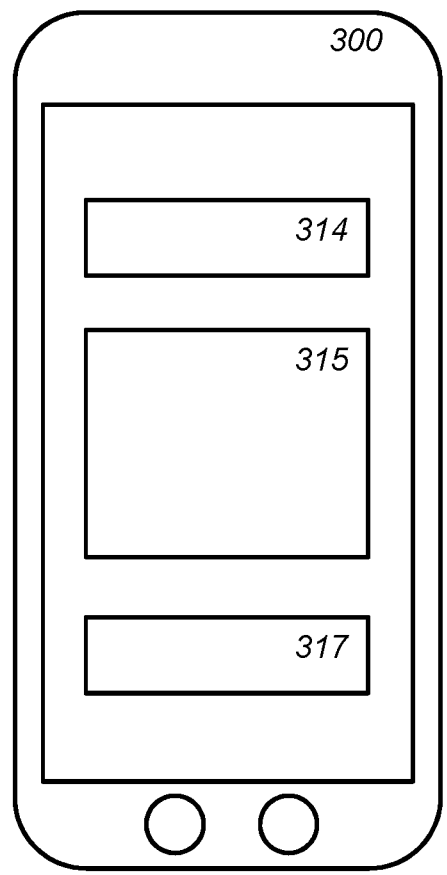

FIGS. 3a and 3b show an exemplary cryptographic device. Shown on the display is a shared secret 314 and a message 315. (Tag 316 and button 317 are optional and discussed elsewhere herein).

Returning to FIG. 2a. As an example the shared secret may be a secret text, e.g., typed earlier by the user, or selected for the user, e.g., randomly selected. The shared secret may be an image, e.g., earlier shown to the user. The image may be randomly generated, e.g., by randomly juxta positioning image elements, e.g., triangles, circles and the like. For example, the image may be captured by a camera of device 200. For example, the camera may be part of the common hardware but nevertheless under control over the second software, e.g., under temporary control. For example, the user may take a selfie or an image of a landmark, e.g., his garden or balcony, as a shared secret, etc. Preferably, the shared secret is only known to the user and the second software.

In an embodiment, a boot code of device 200 may be configured to receive the shared secret from the user during an initializing boot sequence which is configured thereto. For example, the shared secret may be loaded into a TEE at first boot, or full system reset, when the device is assumed to be in a pristine state. Since only the trusted code knows the secrets, the user knows that if the device displays the image and/or the text on screen, the trusted code is in control and no other code is running. Just before returning control to the normal world, the second software may remove the shared secret from memory, if the memory is accessible to the first mode software.

Private key 241 and its corresponding public key may be generated by second software running in secure mode. The private key, e.g., private key 241, may be stored in the secure mode's data. The public key may be sent to the first software, the first software being configured to send the public key to the server.

In an embodiment, the public key could be displayed on the display instead or as well, e.g., in a computer optically readable format together with the shared secret. The optical readable format may be a QR code. This has the advantage that the user can verify before an authority, that the QR code that is shown, is really the public key that corresponds to this private key. This has the advantage that the authority, e.g., a bank cannot be tricked into thinking that a key of the attacker is the key of the user.

Figure 3C:
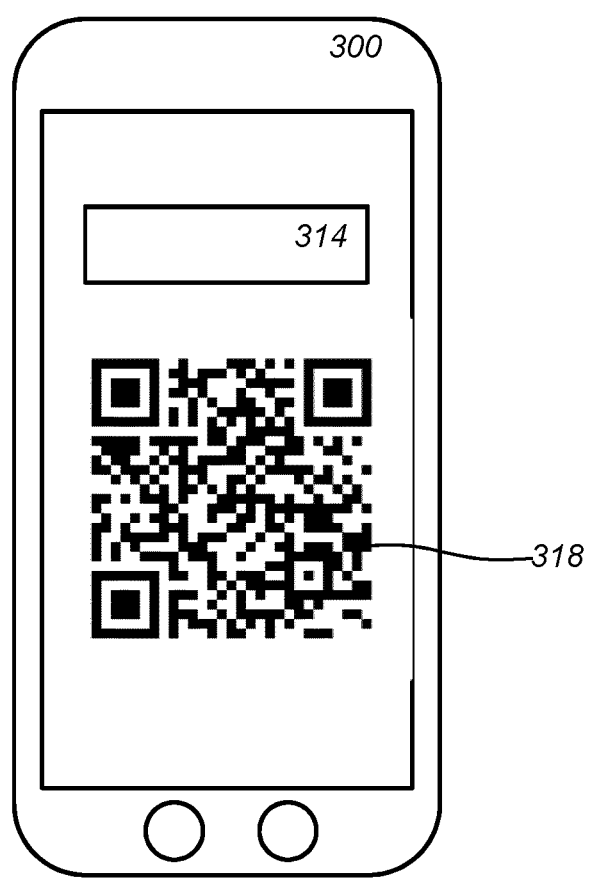

FIG. 3c shows an example. Shown is a QR code 318 which encodes the public key corresponding to private key 241. Also shown in the shared secret 314. Since the shared secret is only stored in a data prat which is only accessible in secure mode, e.g., in the secure world, this screen could not have been displayed by normal mode code, not even if the normal mode code is compromised. A user of device 300 can verify shared secret 314 and then have the screen scanned. In this way, the user is assured that the public key that the scanner will record, e.g., an authority such as a bank, is the public key that really corresponds to his own private key, e.g., private key 241 and not the key of an attacker.

In an embodiment, the user can remove, e.g., swipe away, secret 314 before scanning the screen, to avoid disclosing the shared secret.

In an embodiment, first software 220 makes a request to the server, e.g., a request for a bank transfer. In return, the server may send the encrypted message. For example, the encrypted message may depend on the request. For example, the request may comprise a summary of the request, e.g., the amount of the bank transfer and/or the intended recipient. For example, the request could be a request for a hospital appointment. The message could in that case also include information regarding the request, or regarding the availability at the hospital.

For example, the first software 220 may be configured for sending a transaction request to the server, and receiving in response to the transaction request the encrypted authentication tag 212.

In an embodiment, device 200 may comprise a further visual indicator, e.g., a LED, configured to indicate if a content of the display originated from the secure mode. For example, if the device switches to secure mode, the indicator may turn on. This can be used in addition to, or even instead of, the shared secret. Device 200 may be configured so that first software does not have control over the visual indicator.

FIG. 2b schematically shows an example of an embodiment of a cryptographic device 201, in which the device authenticates itself to the server. The cryptographic device may thus be termed an 'authentication device'. Device 201 may be the same as device 200, except where indicated, in particular, with respect to a number of additions.

Device 201 is configured to receive, in addition, or instead of the message, an encrypted authentication tag 212 from the server. The encrypted authentication tag may be encrypted with a public key of the cryptographic device. This may be the same public key that corresponds to private key 241, but it may also be a different key. For example, device 201 might comprise a message private key 241, and a different tag private key.

Nevertheless, the encrypted authentication tag is also sent from the normal mode to the secure mode, where it may be decrypted by cryptographic processing unit 242. A responder may use the decrypted tag 244 to generate a response message. For example, the response message may comprise the decrypted tag, or a hash of the decrypted tag, or a signature over the decrypted tag, or an encryption of the decrypted tag (with a different key, e.g., with the public key of the server). A response 213 may then be send back to the normal mode, and from there to the server. When the server receives response message 213, it can infer that the generator of the response message knew the decrypted tag, and thus the tag private key, e.g., key 241. From this the server can increase its trust that the message has arrived at the correct device, and even that it was shown on the display.

For example, in an embodiment, the secure mode's data may comprise a public key of the server. The second software may be configured to encrypt the authentication tag with the public key of the server. For example, in an embodiment, the second software may be configured to sign the authentication tag with a private key of the second software, e.g., key 241. The signing could also be done by the first software, but with a different key, e.g., a different private key stored in the normal mode.

Responder 244 may optionally receive input from an input device 272. Input device 272 may be a button, a key, a keyboard, a touch screen, a mouse, a pointer, etc. With the input device the user can indicate that he read the message, or that he agrees to the message. For example, the user may indicate that he agrees to a transaction indicated in the message. FIG. 3b shows an accept-button 317, displayed on a touch display. By touching the button 317 the user indicates that he accepts the transaction. The display may also comprise a reject or cancel button. Instead of a touch-screen button, e.g., accept or reject button, other input devices may be used, e.g., mechanical buttons 312.

The encrypted message may be received in cooperation with the encrypted authentication tag, e.g., both may be part of a larger message, e.g., they may be sequential, etc. They need not necessarily come from the same source, although that would be typical. The tag and message may be in the same encrypted message, possibly with a signature.

Once second software has displayed the message, and obtained a response from a user of device 201 to the displayed message, the authentication tag may be sent to the first software in dependence upon the response. The latter may be in plain, but is preferably done in a cryptographically protected manner, e.g., encrypted for confidentiality.

The tag and/or message may be received over a different communication channel than is used for a response message to the server. For example, in an embodiment, the encrypted authentication tag and/or message may be received over a computer communication interface of a first type, e.g., SMS, and wherein the authentication message is send over a computer communication interface of a second type, e.g., Internet, different from the first type. The tag may comprise a random number, a nonce, or the like.

Note that in device 201, the decrypted tag, or data computed from the decrypted tag may be sent to the first software over a software interface internal to the device 201, e.g., in the form of a message comprising the authentication tag, e.g., interface(s) 231/232.

In an embodiment, the message 213 may one factor in a two-factor authentication scheme. For example, the first software and/or the second software may be configured to receive from the user of the authentication device a further authentication factor, e.g., a credential or a biometric, before completing the authentication to the server. The further credential, etc., could also or instead be included in the response message to the server.

FIG. 2c schematically shows an example of an embodiment of a cryptographic device 202. Device 202 may be the same as device 201 except for the way, the tag is forwarded to the first software.

In device 202, the second software, e.g., display generator 250 may be configured for displaying the authentication tag on the display. The responder is now optional, it may be used, e.g., to terminate the displaying of the message and/or tag.

The user is now expected to enter the displayed tag 273 in first software. Note that in this scenario the software that received the encrypted tag 212 and the software that uses the decrypted tag may be different. For example, first software may be configured for receiving the authentication tag from the user through an input interface of device 202, e.g., input device 272. For example, second software may display the decrypted tag as tag 316 in FIG. 3a. Yet further software, e.g., further first software, may receive the tag as input from the server and use it to authenticate, e.g., to the server. The further software may run on a PC or on the cryptographic device.

Device 202 is especially useful to work with legacy software. For example, consider an existing mobile phone on which existing software is installed, say banking software. The software expects a user to type in an authentication tag that it receives through an SMS message. To upgrade the system to a higher security, the tag may be sent encrypted, instead of entering the encrypted tag, the encrypted tag, e.g., the entire SMS message is forwarded to second software, where it is decrypted and the tag is shown, e.g., together with a message and the shared secret. If the user trusts it, he now enters the decrypted tag in the original banking app. The banking app will act as if the tag was received over an SMS interface although in reality it was passed through second software. The security of the banking app, say, is increased even though it was not changed.

The tag could comprise a sequence of numbers or letters, or a so-called one-time password (OTP).

The principles set out herein may be used to amplify cryptographic confidentiality protection that is used for data received from the server and/or to amplify cryptographic integrity protection. This may be done be by displaying the processed data together with the shared secret, thus increasing trust that the desired cryptographic processing has really been performed by the second software. It follows that if, e.g., the cryptographic integrity protection has failed, the message would not be passed on to the next step, e.g., display of the message. Exactly which combination of encryption and signatures may be used depends on the application, but a number of examples are given below.

A message may be received from the server with a signature. The message is verified with the server's public key, e.g., key 243. Key 241 is optional. Message with a signature are discarded if the signature is wrong.

A message may be received from the server encrypted and with a signature. The message is verified with the server's public key, e.g., key 243 and private key 241.

A message may be received from the server encrypted and without a signature, but the public key corresponding to private key 241 is secret, e.g., only known to the second software and the server.

A message may be received from the server with a signature and/or encryption, and a tag which is encrypted. The message is verified with the server's public key, e.g., key 243 and/or decrypted, and the tag is decrypted with private key 241. In this case, care may be taken that link between the message and the tag cannot be compromised. For example, the signature on the tag may be linked to the message, e.g., by including a hash of the message in the signature. Another way to resolve this is to link the response to the message, e.g., by signing the response with private key 241, the response being dependent upon the tag and the message. For example, a hash over the message and tag may be included. The server can now verify if the correct message was performed.

A single message may comprise information to be displayed and a tag. The single message may be encrypted. Without a signature, it is conceivable that an attacker may change the message without detection. However, by doing so he will likely also change the tag. By returning the tag, or a function of the tag, the device implicitly confirms that the correct information was displayed. A single message can be replaced with multiple messages, e.g., by cryptographically linking them.

As a final example, a single message may comprise information to be displayed and a tag. The single message is encrypted and provided with a signature. The response comprises a function of the tag and of the message, e.g., the tag and message itself or a hash, etc. The server verifies the function of the tag to authenticate the cryptographic device and the function of the message to verify that the correct message was shown. The function of the message may be performed in the secure mode. To demonstrate the latter, the response may also be signed with a private key of the cryptographic device.

In the various embodiments of devices 110, 160, 200, 201, 202, the communication interfaces may be selected from various alternatives. For example, the interface may be a network interface to a local or wide area network, e.g., the Internet, a storage interface to an external data storage, a keyboard, an application interface (API), etc.

The devices 110, 160, 200, 201, 202 may have a user interface, which may include well-known elements such as one or more buttons, a keyboard, display, touch screen, etc. The user interface may be arranged for accommodating user interaction for configuring the systems, e.g., requesting or responding to requests, messages, and the like. Storage may be implemented as an electronic memory, say a flash memory, or magnetic memory, say hard disk or the like. Storage may comprise multiple discrete memories together making up a storage. Storage may comprise a temporary memory, say a RAM. The storage may be cloud storage.

Server 160 may be implemented in a single device. Device may be implemented in a single device. Typically, the device 110, 160, 200, 201, 202 each comprise a microprocessor which executes appropriate software stored at the system; for example, that software may have been downloaded and/or stored in a corresponding memory, e.g., a volatile memory such as RAM or a non-volatile memory such as Flash. Alternatively, the systems may, in whole or in part, be implemented in programmable logic, e.g., as field-programmable gate array (FPGA). The systems may be implemented, in whole or in part, as a so-called application-specific integrated circuit (ASIC), e.g., an integrated circuit (IC) customized for their particular use. For example, the circuits may be implemented in CMOS, e.g., using a hardware description language such as Verilog, VHDL, etc. In particular, devices 110, 160, 200, 201, 202 may comprise circuits for the evaluation of cryptographic primitives, e.g., encryption, decryption, signing, verifying.

A processor circuit may be implemented in a distributed fashion, e.g., as multiple sub-processor circuits. A storage may be distributed over multiple distributed sub-storages. Part or all of the memory may be an electronic memory, magnetic memory, etc. For example, the storage may have volatile and a non-volatile part. Part of the storage may be read-only.

Below several further optional refinements, details, and embodiments are illustrated as an example of possible embodiments.

Figure 4A:
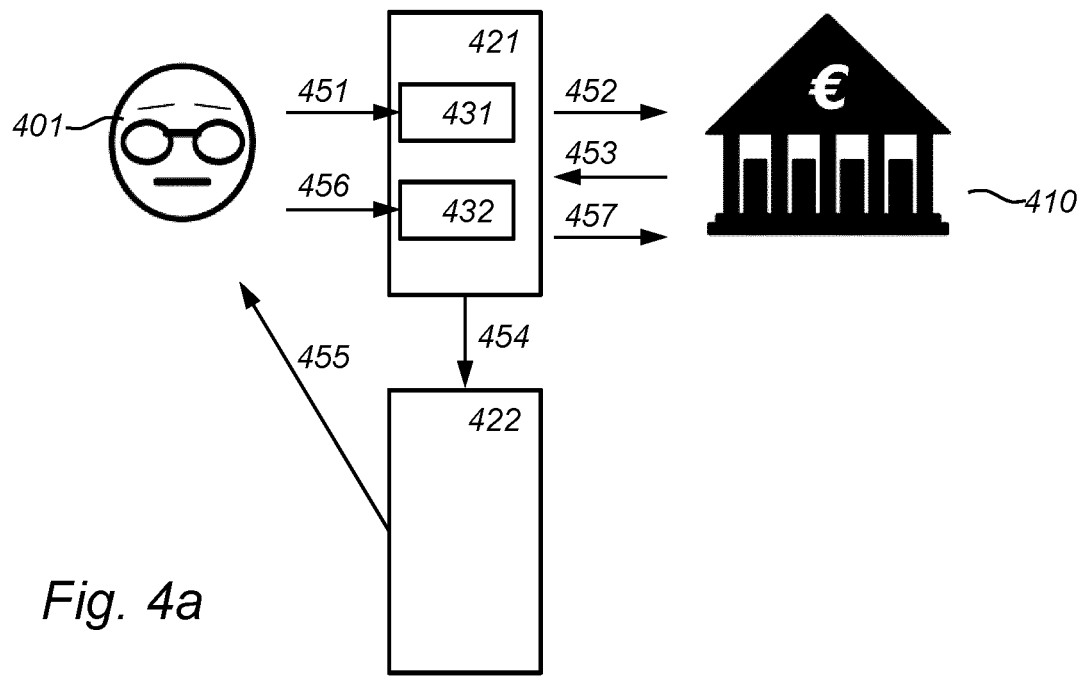
Figure 4B:
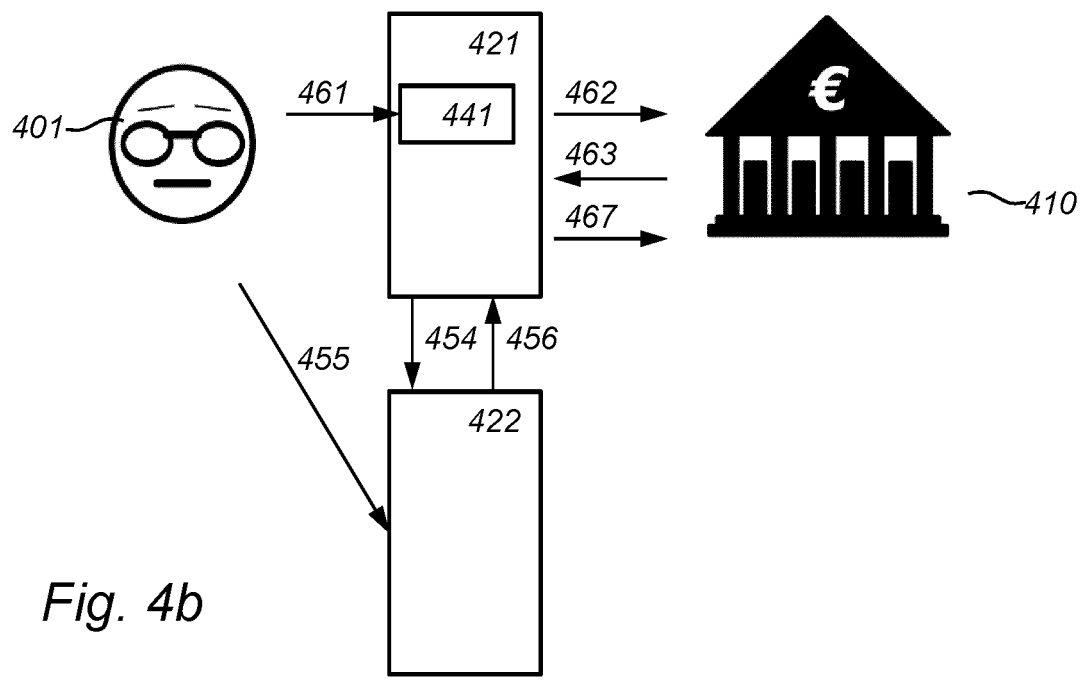

FIGS. 4a and 4b schematically show examples of an embodiment of an authentication method. The figures show a user 401 and a server 410, in this case a bank. A cryptographic device is shown in two modes: while operating in normal mode 421 and while operating in secure mode 422. Part 421 and 422 are the same device though.

FIG. 4a shows, in normal mode, a supporting software 431 and a legacy software 432. In secure mode, second software is run, but this is not separately shown in the figure. The arrows depict the following in FIG. 4a:

451: User initiates a transaction at software 431,
452: Software 431 forwards the request to server 410,
453: Server 410 sends an encrypted message, e.g., comprising an OTP and request summary,
454: Software 431 detects the encrypted message, e.g., SMS, and invokes the secure mode software,
455: User verifies the transaction details and obtains the OTP from the display,
456: User enters the OTP in software 432,
457: Software 432 forwards the OTP to confirm the transaction.

FIG. 4b shows, in normal mode, a first software 441. In this case, there is no legacy software; instead the embodiment is integrated. The arrows depict the following in FIG. 4b:

461: User initiates transaction at software 441,
462: Software 441 forwards the request to server 410
463: Server 410 sends an encrypted message, e.g., comprising an OTP and request summary,
464: Software 441 detects the encrypted message, e.g., SMS, and invokes the secure mode software,
465: User verifies the transaction details and clicks accept,
456: Second software sends signed OTP to software 441,
457: Software 441 forwards the signed OTP to confirm the transaction.

Note that in FIG. 4a the OTP is passed via the user, but in FIG. 4b the OTP is passed via an internal channel. Variants such as described herein may be used; for example, instead of an OTP any tag may be used, the response may be computed differently from the tag. The display in secure mode 422 preferably shows the shared secret.

Several prototypes, named 'SecurePay' have been build and tested, according to an embodiment. These embodiments have the advantage that users are looped in to enforce the authenticity of the transaction. SecurePay uses TEE, such as ARM's TrustZone for creating a hardware-enforced isolated environment. SecurePay uses the authenticity provided by public-key cryptography and the TEE for protecting the integrity of the transaction. SecurePay relies on a software-based secure display implementation, the output of which can only be produced by legitimate code which is recognizable as such by the user. SecurePay provides a tamper-resistant mechanism enforced by the TEE that allows users to securely register with a service provider that allows authentication, e.g., through two factor authentication (2FA).

To provide compatibility, SecurePay is capable of utilizing SMS as the communication channel between the user and service provider, and provides a normal-world component, the SecurePay app, to communicate the received encrypted SMS to a SecurePay's trusted app (TA) in the TEE. Although it may be beneficial to do so, the service providers do not have to modify their mobile app to utilize SecurePay.

Upon receiving the encrypted OTP and transaction summary, the user can invoke the SecurePay app to display the decrypted message on the secure screen (controlled by the TEE).

Two different types of embodiments were tried in operation, one that is a fully transparent drop-in replacement for existing SMS-based schemes, and another which requires a small modification to the service providers' apps but offers full integration to simplify the user interaction.

A drop-in replacement mode is illustrated in FIG. 4a. First, the user initiates a transaction from an app on the phone (or in the browser running on her PC). The service provider receives this request and responds with an SMS containing an encrypted message (using the public key the user's SecurePay) that includes the transaction summary and an OTP. The SecurePay's secure app receives this SMS and launches the trusted UI to display the transaction summary and the OTP to the user. Once the user verifies the authenticity of the transaction, she can switch to the service provider's app and enter the OTP, exactly like she would do with existing SMS-based OTPs. This OTP is then forwarded to the service provider and if it matches the one sent by the provider earlier, the transaction completes successfully. This version of SecurePay does not require any modification on the service provider's app on the phone, but it does require the user to memorize (or note down) the OTP and enter it in the service provider's mobile app (or web interface) to confirm the transaction. Fortunately, studies in psychology have shown that humans can remember without difficulty on average 7 items in their short memory. Currently, most services are using fewer digits (5 to 6) as OTP.

SecurePay can hide the OTP entirely with a small modification of the service provider's app to fully integrate SecurePay. FIG. 4b shows a possible sequence for confirming a transaction in this version of SecurePay. The main difference is that the service provider's app directly communicates with the SecurePay trusted app Similar to the previous version, the user initiates a transaction using the service provider's app. The service provider then sends an SMS with an encrypted summary and an OTP to the phone. Given that we do not want to increase SecurePay's code base, we let the provider's app (instead of SecurePay) receive this information (via SMS or Internet) and forward it to the SecurePay trusted app which decrypts the message and shows the user the transaction summary (but no OTP). The only thing the user needs to do, is accept or reject this transaction after looking at the summary. The SecurePay trusted app then transparently signs the OTP and sends it to the service provider's app which in turn forwards the signed OTP to the service provider. Upon receiving the signed OTP, the provider completes the transaction if the OTP matches the one sent earlier. This version of SecurePay provides more convenience for the user, but requires a small modification of the service provider's app (around 20 lines of code on average).

Enabling SecurePay with an actual service may involve communicating the public key to the service. In case the user owns several devices, all devices may register with the SecurePay-protected service. Registration may take place when the user installs the client part (e.g., a mobile application) on the device. For successful registration, the user may communicate the public key securely to the service—in terms of integrity, not necessarily confidentiality.

After installing the SecurePay mobile app, the user can invoke the SecurePay TA to display the QR code of the public key on the trusted screen. Note that the user can make sure the display is currently controlled by the trusted app by verifying the personalized image or secret text before sharing it to the bank. Finally, the bank simply scans the QR code to retrieve the public key safely from the user's device.

Even though the mobile device may be already compromised at registration time, attackers are prevented from registering their own public keys with a user's account.

Note that the registration for SecurePay is comparable to or simpler than that of many other payment services. For example, to enable e-banking, many banks require hardware tokens. More importantly, the threat model for SecurePay is considerably stronger than that of existing systems—protecting the user against attacks launched from a fully compromised device, where the attacker controls even the device's operating system kernel.

Figure 5:
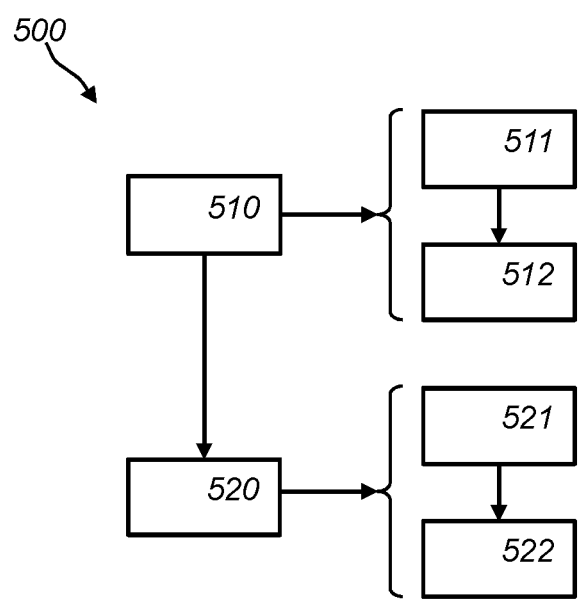
Figure 6A:
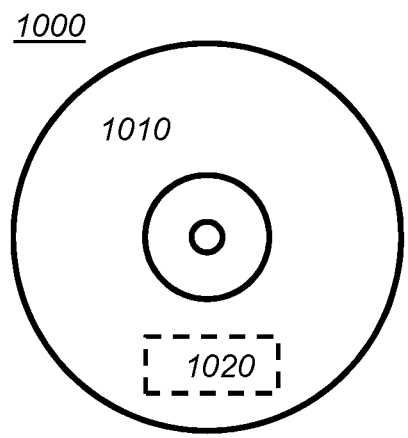
Figure 6B:
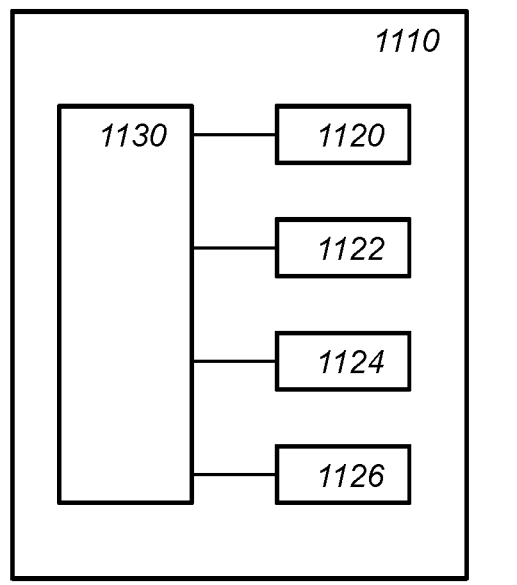

FIG. 5 schematically shows an example of an embodiment of a cryptographic method 500. Method 500 may be computer implemented and comprises executing (510) first software in a normal mode of a processor system, the processor system being configured with the normal mode and a secure mode, data and code in the secure mode being isolated from the normal mode, the data in the secure mode comprising at least a private key and a secret shared with a user, executing the first software comprising receiving (511) an encrypted message from the server, the encrypted message being encrypted with the public key of the cryptographic device that corresponds to the private key, forwarding (512) the encrypted message to second software, and executing (520) second software in the secure mode, executing the second software comprising decrypting (521) the encrypted message with the private key stored in the secure mode's data, displaying (522) the shared secret together with the message on a display to indicate to the user that the message is being displayed by software running in the secure mode.

An interesting variant of the method is obtained by performing verification of a signature instead of, or in addition to, decrypting a message.

For example, the cryptographic method may be a computer implemented method. For example, executing the first and second software may be done on a processor system, e.g., a processor, e.g., a microprocessor. For example, receiving and displaying may use hardware, e.g., a receiving interface, an antenna, etc., a display, a display screen, a display interface. For example, forwarding may use an internal forwarding mechanism, e.g., a bus, an API, a controller, etc. For example, decrypting may use a cryptographic coprocessor. The size of the private key may depend on the particular asymmetric encryption/decryption scheme that is chosen, the platform, the desired security level and so on. For example, for ElGamal one may use a key size of 768 bit, or less, or more. For example, for RSA one could use 2048 bits, or less, or more, and so on. The asymmetric encryption/decryption may be used in conjunction with an ephemeral symmetric key, e.g., of 128 bits, or less, or more.

Many different ways of executing the method are possible, as will be apparent to a person skilled in the art. For example, the order of the steps can be performed in the shown order, but the order of the steps can be varied or some steps may be executed in parallel. Moreover, in between steps other method steps may be inserted. The inserted steps may represent refinements of the method such as described herein, or may be unrelated to the method. For example, some steps may be executed, at least partially, in parallel. Moreover, a given step may not have finished completely before a next step is started.

Embodiments of the method may be executed using software, which comprises instructions for causing a processor system to perform method 500. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. Embodiments of the method may be executed using a bitstream arranged to configure programmable logic, e.g., a field-programmable gate array (FPGA), to perform the method.

It will be appreciated that the presently disclosed subject matter also extends to computer programs, particularly computer programs on or in a carrier, adapted for putting the presently disclosed subject matter into practice. The program may be in the form of source code, object code, a code intermediate source, and object code such as partially compiled form, or in any other form suitable for use in the implementation of an embodiment of the method. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the devices, units and/or parts of at least one of the systems and/or products set forth.

FIG. 7a shows a computer readable medium 1000 having a writable part 1010 comprising a computer program 1020, the computer program 1020 comprising instructions for causing a processor system to perform a method for secure communication according to an embodiment. The computer program 1020 may be embodied on the computer readable medium 1000 as physical marks or by magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said method for secure communication.

FIG. 7b shows in a schematic representation of a processor system 1140 according to an embodiment of a cryptographic device or a method for secure communication. The processor system comprises one or more integrated circuits 1110. The architecture of the one or more integrated circuits 1110 is schematically shown in FIG. 7b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor unit 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, processor system 1140, e.g., the cryptographic device may comprise a processor circuit and a memory circuit, the processor being arranged to execute software stored in the memory circuit. For example, the processor circuit may be an Intel Core i7 processor, ARM Cortex-R8, etc. In an embodiment, the processor circuit may be ARM Cortex M0. The memory circuit may be an ROM circuit, or a non-volatile memory, e.g., a flash memory. The memory circuit may be a volatile memory, e.g., an SRAM memory. In the latter case, the device may comprise a non-volatile software interface, e.g., a hard drive, a network interface, etc., arranged for providing the software.

As used herein, the term "non-transitory" will be understood to exclude transitory signals but to include all forms of storage, including both volatile and non-volatile memories. While device 1110 is shown as including one of each described component, the various components may be duplicated in various embodiments. For example, the processor unit 1120 may include multiple microprocessors that are configured to independently execute the methods described herein or are configured to perform steps or subroutines of the methods described herein such that the multiple processors cooperate to achieve the functionality described herein. Further, where the device 1110 is implemented in a cloud computing system, the various hardware components may belong to separate physical systems. For example, the processor 1120 may include a first processor in a first server and a second processor in a second server.

The following numbered clauses are not the claims, but include contemplated examples. New claims may be formulated to such clauses and/or combinations of such clauses and/or features taken from the description or claims, e.g., during prosecution of the present application or of any further application derived therefrom.

1. A cryptographic device configured for secure communication with a server, the device comprising
   a communication interface configured to communicate with the server,
   a processor system configured with a normal mode and a secure mode, data and code in the secure mode being isolated from the normal mode, the data in the secure mode comprising at least a private key corresponding to a public key of the cryptographic device and a secret shared with the user of the device, wherein
   in the normal mode, a first software is executed, the first software being configured for
      receiving an encrypted message from the server, the encrypted message being encrypted with the public key of the cryptographic device,
      forwarding the encrypted message to second software,
   in the secure mode, the second software is executed, the second software being configured for
      decrypting the encrypted message with a private key stored in the secure mode's data,
      displaying the shared secret together with the message on a display of the cryptographic device to indicate to the user that the message is being displayed by software running in the secure mode.

2. A cryptographic device as in clause 1, further configured to authenticate to the server,
   the authentication software being configured for, in the normal mode,
      receiving an encrypted authentication tag from the server, the encrypted authentication tag being encrypted with a public key of the cryptographic device,
      having the encrypted authentication tag decrypted by the second software,
      sending an authentication message to the server that depends on the authentication tag to authenticate the cryptographic device to the server,
   the second software being configured for, in the secure mode,
      decrypting the encrypted authentication tag with a private key corresponding to the public key.

3. A cryptographic device as in Clause 2, wherein the encrypted message is received in cooperation with the encrypted authentication tag, the second software being configured for
   obtaining a response from a user of the cryptographic device to the displayed message,
   sending the authentication tag to the first software in dependence upon the response.

4. A cryptographic device as in any one of the preceding clauses, wherein
   the second software is configured for sending a message to the first software comprising the authentication tag over a software interface internal to the cryptographic device, or
   the second software is configured for displaying the authentication tag on the display, the first authentication being configured for receiving the authentication tag from the user through an input interface of the cryptographic device.

5. A cryptographic method (500) for secure communication with a server, the method comprising
   executing (510) first software in a normal mode of a processor system, the processor system being configured with the normal mode and a secure mode, data and code in the secure mode being isolated from the normal mode, the data in the secure mode comprising at least a private key and a secret shared with a user, executing the first software comprising
      receiving (511) an encrypted message from the server, the encrypted message being encrypted with the public key of the cryptographic device that corresponds to the private key,
      forwarding (512) the encrypted message to second software, and
   executing (520) second software in the secure mode, executing the second software comprising
      decrypting (521) the encrypted message with the private key stored in the secure mode's data, displaying (522) the shared secret together with the message on a display to indicate to the user that the message is being displayed by software running in the secure mode.

6. A cryptographic device configured for secure communication with a server, the device comprising
a communication interface configured to communicate with the server,
a processor system configured with a normal mode and a secure mode, data and code in the secure mode being isolated from the normal mode, the data in the secure mode comprising at least a secret shared with the user of the device, wherein
in the normal mode, a first software is executed, the first software being configured for
receiving a signed message from the server, the signed message being signed with a private key of the server,
forwarding the signed message to second software,
in the secure mode, the second software is executed, the second software being configured for
verifying the signature on the signed message using a public key corresponding to the a private key of the server,
displaying the shared secret together with the message on a display of the cryptographic device to indicate to the user that the message is being displayed by software running in the secure mode.

7. A cryptographic method for secure communication with a server, the method comprising
executing first software in a normal mode of a processor system, the processor system being configured with the normal mode and a secure mode, data and code in the secure mode being isolated from the normal mode, the data in the secure mode comprising at least a secret shared with a user, executing the first software comprising
receiving a signed message from the server, the signed message being signed with a private key of the server,
forwarding the signed message to second software, and
executing second software in the secure mode, executing the second software comprising
verifying the signature on the signed message using a public key corresponding to the a private key of the server,
displaying the shared secret together with the message on a display to indicate to the user that the message is being displayed by software running in the secure mode.

It should be noted that the above-mentioned embodiments illustrate rather than limit the presently disclosed subject matter, and that those skilled in the art will be able to design many alternative embodiments.

In the claims, any reference signs placed between parentheses shall not be construed as limiting the claim. Use of the verb 'comprise' and its conjugations does not exclude the presence of elements or steps other than those stated in a claim. The article 'a' or 'an' preceding an element does not exclude the presence of a plurality of such elements. Expressions such as "at least one of" when preceding a list of elements represent a selection of all or of any subset of elements from the list. For example, the expression, "at least one of A, B, and C" should be understood as including only A, only B, only C, both A and B, both A and C, both B and C, or all of A, B, and C. The presently disclosed subject matter may be implemented by hardware comprising several distinct elements, and by a suitably programmed computer. In the device claim enumerating several parts, several of these parts may be embodied by one and the same item of hardware. The mere fact that certain measures are recited in mutually different dependent claims does not indicate that a combination of these measures cannot be used to advantage.

In the claims references in parentheses refer to reference signs in drawings of exemplifying embodiments or to formulas of embodiments, thus increasing the intelligibility of the claim. These references shall not be construed as limiting the claim.

The invention claimed is:

1. A cryptographic device comprising:
a communication interface circuit, wherein the communication interface circuit is arranged to communicate with a server,
a processor circuit,
wherein the processor circuit has a normal mode and a secure mode,
wherein a data and a code are isolated from the normal mode when the processor circuit is in the secure mode,
wherein the data comprises at least a first private key and secret,
wherein the first private key corresponds to a first public key,
wherein the secret is shared with a user,
wherein a first software is executed when the processor circuit is in the normal mode,
wherein when the processor circuit is in the normal mode, the first software is arranged to receive an encrypted message and an encrypted authentication tag from the server,
wherein the encrypted message and encrypted authentication tag are encrypted with the first public key,
wherein when the processor circuit is in the normal mode, the first software is arranged to forward the encrypted message and the encrypted authentication tag to second software,
wherein the second software is executed when the processor circuit is in the secure mode,
wherein when the processor circuit is in the secure mode, the second software is arranged to decrypt the encrypted message and encrypted authentication tag with the first private key,
wherein the first private key is stored in data of the secure mode, wherein when the processor circuit is in the secure mode, the second software is arranged to display the shared secret, the message and the decrypted authentication tag so as to indicate to the user that the message is displayed by software running in the secure mode,
wherein a legacy software is arranged to receive the decrypted authentication tag from the user through an input interface of the cryptographic device.

2. The cryptographic device as in claim 1,
wherein the cryptographic device is arranged to authenticate to the server,
wherein the legacy software is arranged to send an authentication message to the server,
wherein the authentication message depends on the decrypted authentication tag so as to authenticate the cryptographic device to the server.

3. The cryptographic device as in claim 1,
wherein the encrypted message and the encrypted authentication tag are a portion of a larger message,
wherein the second software is arranged to obtain a response to the message from the user.

4. The cryptographic device as in claim 1, wherein a boot code of the cryptographic device is arranged to receive the shared secret from the user during an initializing boot sequence.

5. The cryptographic device as in claim 1,
wherein the display is operated from a first frame buffer,
wherein the first frame buffer is accessible from the normal mode,
wherein the display is operated from a second frame buffer,
wherein the second frame buffer is accessible from the secure mode but not the normal mode.

6. The cryptographic device as in claim 1,
wherein an SMS message comprises the encrypted authentication tag,
wherein the first software is arranged to intercept the SMS message,
wherein the first software is arranged to forward the message to the second software,
wherein the second software is arranged to provide the user with the decrypted authentication tag.

7. The cryptographic device as in claim 1,
wherein the second software is arranged to generate the first public key and the first private key,
wherein the second software is arranged to store the first private key in the secure mode's data,
wherein the second software is arranged to send the first public key to the first software,
wherein the first software is arranged to send the first public key to the server,
wherein the first software is arranged to display the first public key and the shared secret,
wherein the first public key is displayed in an optically readable format.

8. The cryptographic device as in claim 1, wherein the first software and/or the second software is arranged to receive from the user a further authentication factor before completing the authentication to the server.

9. The cryptographic device as in claim 1,
wherein the first software is arranged to send a transaction request to the server,
wherein the first software is arranged to receive the encrypted authentication tag in response to the transaction request.

10. The cryptographic device as in claim 9, wherein the message depends on the request.

11. The cryptographic device as in claim 1,
wherein the cryptographic device comprises a visual indicator,
wherein the visual indicator is arranged to indicate if a content of the display originated from the secure mode.

12. The cryptographic device as in claim 1, wherein at least a portion of software running in normal mode cannot overwrite the message when the message displayed on the display.

13. The cryptographic device as in claim 1, wherein at least a portion of software running in normal mode is prevented from screen capturing the message.

14. The cryptographic device as in claim 1,
wherein wherien the first software is arranged to receive the encrypted message,
wherein the encrypted message is signed,
wherein the signed message is signed with a second private key,
wherein the second private key belongs to the server,
wherein the second software is arranged to verify the signature on the signed message using a second public key,
wherein the second public key corresponds to the second private key of the server.

15. The cryptographic device as in claim 1,
wherein the second software is arranged to generate the first public key and the first private key,
wherein the second software is arranged to store the first private key in the secure mode's data,
wherein the second software is arranged to send the first public key to the first software,
wherein the first software is arranged to send the first public key to the server, or the first software is arranged to display the first public key and the shared secret,
wherein the first public key is displayed in an optically readable format.

16. A cryptographic method comprising:
executing a first software in a normal mode of a processor circuit,
wherein the processor circuit has the normal mode and a secure mode,
wherein a data and a code are isolated from the normal mode when the processor circuit is in the secure mode,
wherein the data comprises at least a first private key and a secret,
wherein the secret is shared with a user,
wherein executing the first software in a normal mode comprises: receiving an encrypted message and an encrypted authentication tag from the server, wherein the encrypted message and encrypted authentication tag are encrypted with a first public key, wherein the first public key corresponds to the first private key,
forwarding the encrypted message and encrypted authentication tag to second software, and
executing second software in the secure mode, wherein executing the second software in the secure mode comprises: decrypting the encrypted message and encrypted authentication tag with the first private key, wherein the first private key is stored in data of the secure mode,
displaying the shared secret, the message and the decrypted authentication tag so as to indicate to the user that the message is displayed by software running in the secure mode,
wherein a legacy software is arranged to receive the decrypted authentication tag from the user through an input interface.

17. The method as in claim 16, further comprising authenticating to the server,
wherein the legacy software is arranged to send an authentication message to the server,
wherein the authentication message depends on the decrypted authentication tag so as to authenticate the cryptographic device to the server.

18. The method as in claim 16,
wherein the encrypted message and the encrypted authentication tag are a portion of a larger message,
wherein the second software is arranged to obtain a response to the message from the user.

19. The method as in claim 16, wherein a boot code of the cryptographic device is arranged to receive the shared secret from the user during an initializing boot sequence.

20. A non-transitory computer-readable medium comprising computer-executable instructions, which when executed by a processor system, cause the processor system to perform an operation comprising:
- executing a first software in a normal mode of a processor circuit,
- wherein the processor circuit has the normal mode and a secure mode,
- wherein a data and a code are isolated from the normal mode when the processor circuit is in the secure mode,
- wherein the data comprises at least a first private key and a secret,
- wherein the secret is shared with a user,
- wherein executing the first software in a normal mode comprises:
  - receiving an encrypted message and an encrypted authentication tag from the server,
  - wherein the encrypted message and encrypted authentication tag are encrypted with a first public key,
  - wherein the first public key corresponds to the first private key,
  - forwarding the encrypted message and encrypted authentication tag to second software, and
  - executing second software in the secure mode, wherein executing the second software in the secure mode comprises:
- decrypting the encrypted message and encrypted authentication tag with the first private key, wherein the first private key is stored in data of the secure mode,
- displaying the shared secret, the message and the decrypted authentication tag so as to indicate to the user that the message is displayed by software running in the secure mode,
- wherein a legacy software is arranged to receive the decrypted authentication tag from the user through an input interface.

* * * * *